United States Patent
Han et al.

(10) Patent No.: US 9,018,849 B2
(45) Date of Patent: Apr. 28, 2015

(54) SIGNAL PROCESS METHOD, SIGNAL PROCESS CIRCUIT AND LED DIMMING CIRCUIT THEREOF

(71) Applicant: Silergy Semiconductor Technology (Hangzhou) Ltd, Hangzhou, ZheJiang Province (CN)

(72) Inventors: Yunlong Han, Hangzhou (CN); Huiqiang Chen, Hangzhou (CN)

(73) Assignee: Silergy Semiconductor Technology (Hangzhou) Ltd., Hangzhou (CN)

( * ) Notice: Subject to any disclaimer, the term of this patent is extended or adjusted under 35 U.S.C. 154(b) by 0 days.

(21) Appl. No.: 14/307,755

(22) Filed: Jun. 18, 2014

(65) Prior Publication Data

US 2014/0375226 A1     Dec. 25, 2014

(30) Foreign Application Priority Data

Jun. 25, 2013 (CN) .......................... 2013 1 0258059

(51) Int. Cl.
*H05B 41/16* (2006.01)
*H05B 33/08* (2006.01)

(52) U.S. Cl.
CPC ........ *H05B 33/0815* (2013.01); *H05B 33/0845* (2013.01); *Y02B 20/42* (2013.01)

(58) Field of Classification Search
USPC .......... 327/100, 164, 172, 176, 291; 315/246, 315/291
See application file for complete search history.

(56) References Cited

U.S. PATENT DOCUMENTS

| | | | |
|---|---|---|---|
| 7,489,173 B1 * | 2/2009 | Verma et al. .................. | 327/175 |
| 7,796,719 B2 * | 9/2010 | Liu et al. ....................... | 375/373 |
| 8,581,511 B2 | 11/2013 | Kim et al. | |
| 8,662,858 B2 | 3/2014 | Marando et al. | |
| 2011/0227502 A1 * | 9/2011 | Kim et al. ...................... | 315/291 |
| 2014/0117898 A1 | 5/2014 | Han et al. | |

* cited by examiner

*Primary Examiner* — Thuy Vinh Tran
(74) *Attorney, Agent, or Firm* — Michael C. Stephens, Jr.

(57) ABSTRACT

In one embodiment, method of signal processing can include: (i) determining a high level sampling pulse amount by counting a number of pulses of a first clock signal during a high level portion of a period of a first PWM; (ii) generating a first pulse signal based on a second clock signal and the high level sampling pulse amount; (iii) determining a low level sampling pulse amount by counting a number of pulses of the first clock signal during a low level portion of the period of the first PWM signal; (iv) generating a second pulse signal based on the second clock signal and the low level sampling pulse amount; and (v) generating a second PWM signal based on the first and second pulse signals.

16 Claims, 4 Drawing Sheets

SIGNAL PROCESS METHOD, SIGNAL PROCESS CIRCUIT AND LED DIMMING CIRCUIT THEREOF

RELATED APPLICATIONS

This application claims the benefit of Chinese Patent Application No. 201310258059.6, filed on Jun. 25, 2013, which is incorporated herein by reference in its entirety.

FIELD OF THE INVENTION

The present invention generally relates to electronic devices and methods, and more particularly to a signal processing method, a signal processing circuit, and an associated LED dimming circuit.

BACKGROUND

A pulse-width modulation signal (PWM) signal is often employed as a dimming control signal to regulate the brightness of a light-emitting diode (LED). In such a dimming process, duty cycle information of a PWM signal can be converted to a linear electronic signal to simulate the linear output of the LED. In one example, a first-order RC filter can be used as an LED dimming circuit. Also, the cutoff frequency ($f_c$) of the filter can be ½πRC, where cutoff frequency $f_c$ may be less than the dimming frequency of the PWM signal. That is, the less cutoff frequency $f_c$ is, the higher the parameter R*C.

SUMMARY

In one embodiment, a method of signal processing can include: (i) determining a high level sampling pulse amount by counting a number of pulses of a first clock signal during a high level portion of a period of a first PWM; (ii) generating a first pulse signal based on a second clock signal and the high level sampling pulse amount, where a frequency of the second clock signal is higher than a frequency of the first clock signal; (iii) determining a low level sampling pulse amount by counting a number of pulses of the first clock signal during a low level portion of the period of the first PWM signal; (iv) generating a second pulse signal based on the second clock signal and the low level sampling pulse amount; and (v) generating a second PWM signal based on the first and second pulse signals, where a period of the second PWM signal is less than a period of the first PWM signal, and where a duty cycle of the first PWM signal matches a duty cycle of the second PWM signal.

In one embodiment, a signal processing circuit can include: (i) a sampling circuit configured to determine a high level sampling pulse amount by counting a number of pulses of a first clock signal during a high level portion of a period of a first PWM signal, and to determine a low level sampling pulse amount by counting a number of pulses of the first clock signal during a low level portion of the period of the first PWM signal; (ii) a pulse counter control circuit configured to generate a first pulse signal based on a second clock signal and the high level sampling pulse amount, and to generate a second pulse signal based on the second clock signal and the low level sampling pulse amount, where a frequency of the second clock signal is higher than a frequency of the first clock signal; and (iii) a PWM signal generator configured to generate a second PWM signal based on the first and second pulse signals, where a period of the second PWM signal is less than a period of the first PWM signal, and where a duty cycle of the first PWM signal matches a duty cycle of the second PWM signal.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

When the dimming frequency of a light-emitting diode (LED) is relatively low, the cutoff frequency $f_c$ of the filter may also be very low (e.g., $f_c$ may be as low as from about 100 Hz to about 300 Hz). In using an RC filter to achieve LED dimming, resistor R and capacitor C of relatively high parameters may be utilized. In this situation, a resistor with such a high resistance and a capacitor of such a high capacitance may be difficult to integrate into an integrated circuit or chip. Further, because the response rate of such an RC filter may be relatively low, and it may take several periods for the dimming signal to effectively respond. Thus, usage of an RC filter in LED dimming applications may encounter problems of integration difficulties, and a lower response rate.

In one embodiment, a signal processing circuit can include: (i) a sampling circuit configured to determine a high level sampling pulse amount by counting a number of pulses of a first clock signal during a high level portion of a period of a first pulse-width modulation (PWM) signal, and to determine a low level sampling pulse amount by counting a number of pulses of the first clock signal during a low level portion of the period of the first PWM signal; (ii) a pulse counter control circuit configured to generate a first pulse signal based on a second clock signal and the high level sampling pulse amount, and to generate a second pulse signal based on the second clock signal and the low level sampling pulse amount, where a frequency of the second clock signal is higher than a frequency of the first clock signal; and (iii) a PWM signal generator configured to generate a second PWM signal based on the first and second pulse signals, where a period of the second PWM signal is less than a period of the first PWM signal, and where a duty cycle of the first PWM signal matches a duty cycle of the second PWM signal.

Figure 1:
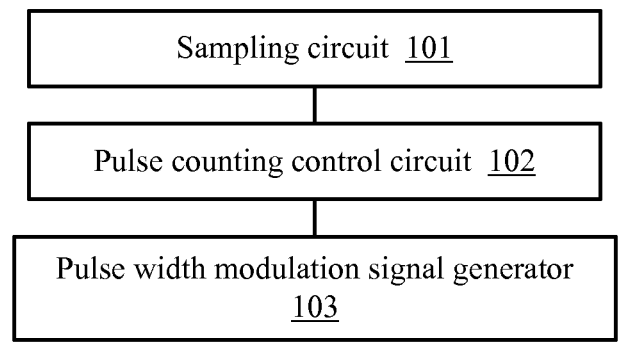
FIG. 1 is a block diagram of an example signal processing circuit, in accordance with embodiments of the present invention.

Referring now to FIG. 1, shown is a block diagram of an example signal processing circuit, in accordance with embodiments of the present invention. This example signal processing circuit can include sampling circuit 101, pulse counting control circuit 102, and PWM signal generator 103. For example, sampling circuit 101 can receive a PWM signal and a clock signal, and may provide an output to pulse counting control circuit 102. An output of pulse counting control circuit 102 may be coupled to an input of PWM signal generator 103.

Figure 3:
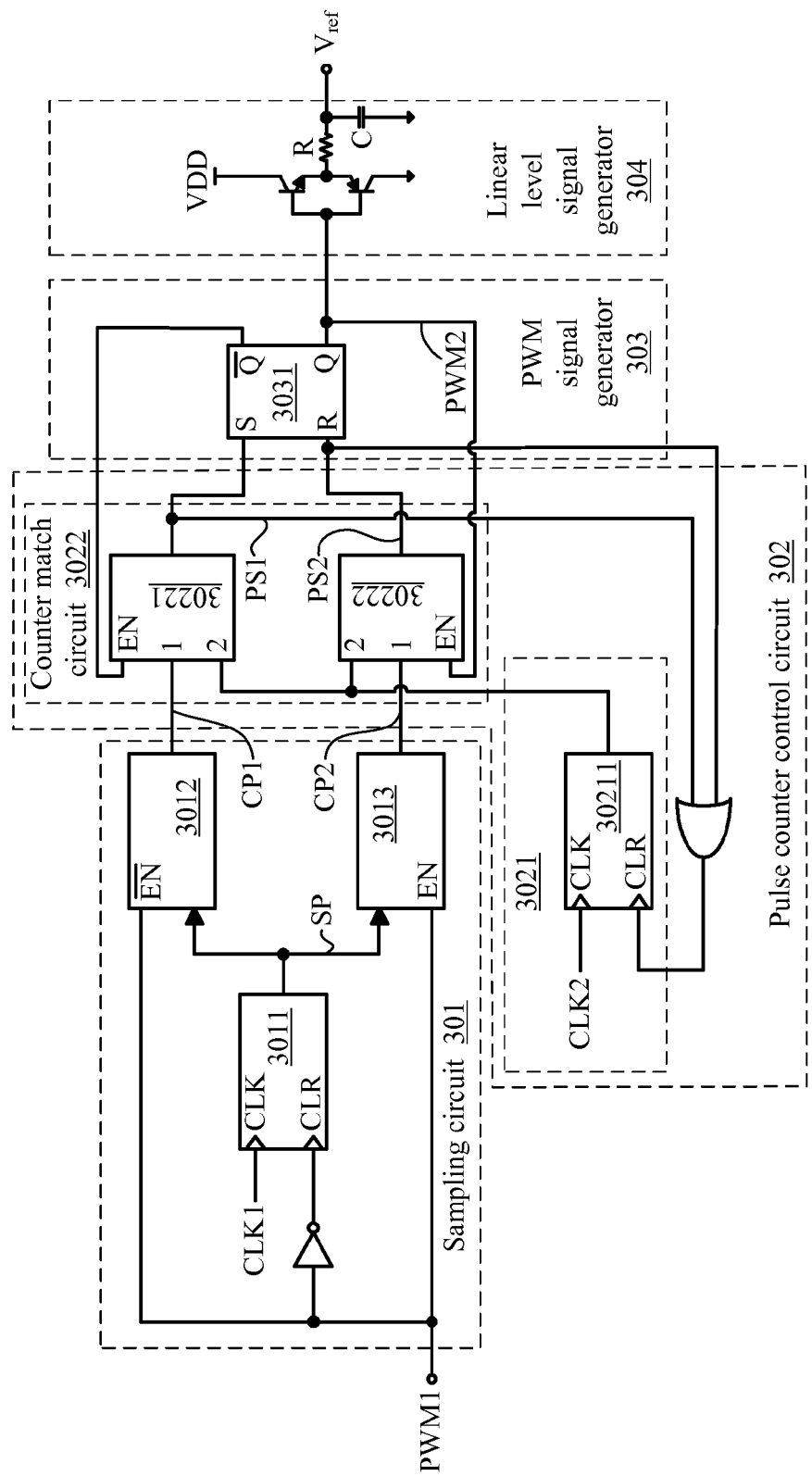
FIG. 3 is a schematic block diagram of an example signal processing circuit, in accordance with embodiments of the present invention.

In particular embodiments, a PWM signal (e.g., PWM1) may be sampled by sampling circuit 101 based on a frequency of a clock signal (e.g., CLK1) to generate a sampling pulse (e.g., SP in FIG. 3). In addition, a number of sampling pulses (or CLK1 pulses) that occur during a portion of a period when the PWM signal (e.g., PWM1) is high (e.g., a logic high level) can be indicated as a "high level sampling pulse amount." Similarly, the number of sampling pulses (or CLK1 pulses) that occur during a portion of a period when the PWM signal (e.g., PWM1) is low (e.g., a logic low level) can be indicated as a "low level sampling pulse amount."

Figure 2:
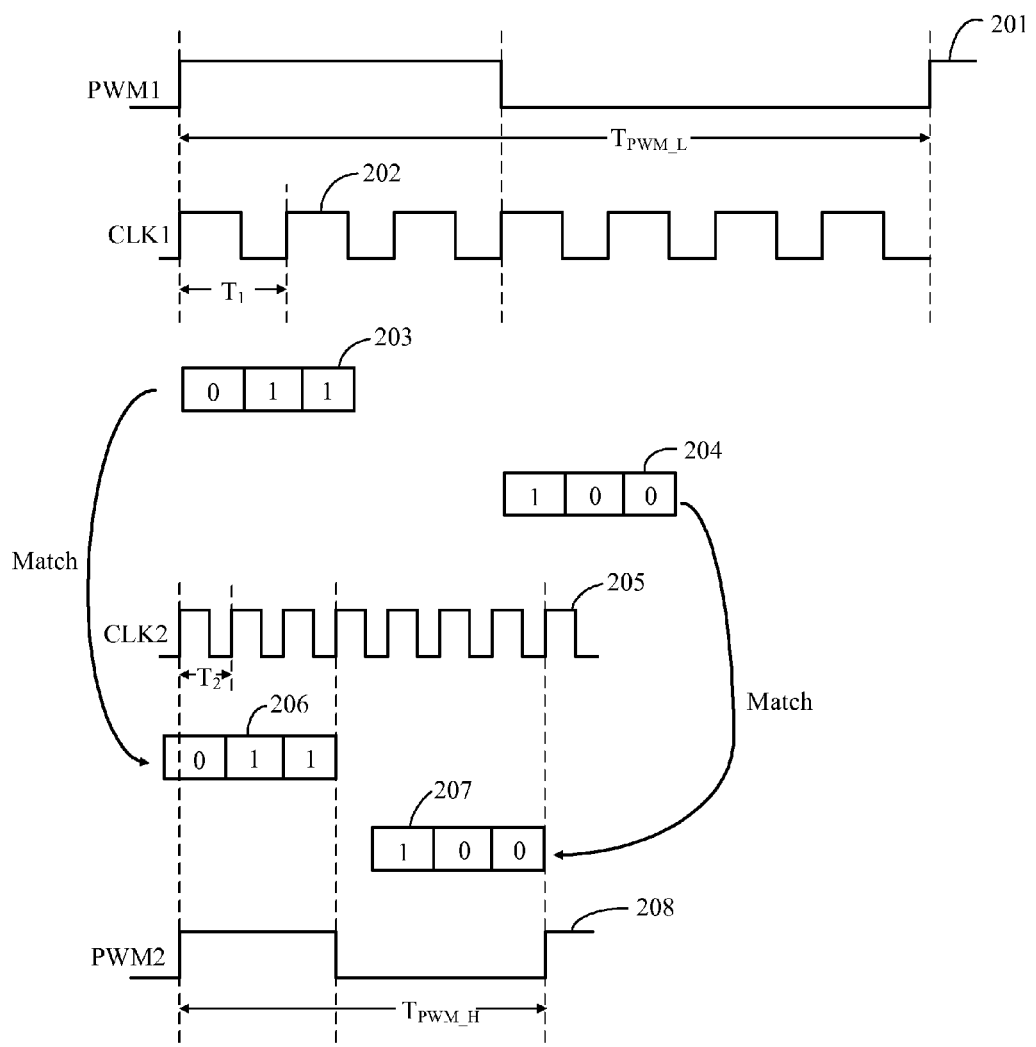
FIG. 2 is a waveform and operational diagram of example signal processing circuitry, in accordance with embodiments of the present invention.

Referring now to FIG. 2, shown is a waveform and operational diagram of example signal processing circuitry, in accordance with embodiments of the present invention. The example waveform of clock signal CLK1 is shown as waveform 202, and the period of which is indicated as $T_1$. The example waveform of signal PWM1 is shown as waveform 201, and the period of which is indicated as $T_{PWM\_L}$. Also, the duty cycle D of signal PWM1 can be indicated as:

$$D = \frac{3T_1}{3T_1 + 4T_1} = \frac{3}{7}$$

Signal PWM1 (201) may be sampled by clock signal CLK1 (202). In this particular example period $T_{PWM\_L}$, the high level sampling pulse amount is 3, and corresponding binary data (e.g., 011) is shown at 203. Also in this example period $T_{PWM\_L}$, the low level sampling pulse amount is 4, and corresponding binary data (e.g., 100) is shown at 204. Pulse counting control circuit 102 can count the pulses of a different clock signal (e.g., CLK2) based on the output of sampling circuit 101, which may be employed as a count reset control signal. For example, the frequency of clock signal CLK2 may be higher than that of clock signal CLK1.

In particular embodiments, a number of pulses of clock signal CLK2 may be counted (e.g., from zero) by pulse count control circuit 102 until the number of pulses (a cumulative pulse number) reaches the high level sampling pulse amount. This cumulative pulse number may be stored, and a corresponding pulse signal PS1 may be generated therefrom.

For example, if the high level sampling pulse amount is 3, the number of pulses of clock signal CLK2 (waveform 205) may be counted by pulse count control signal 102. When the pulse count by pulse count control signal 102 reaches 3 at the third pulse of CLK2 (e.g., as determined by a binary bit-by-bit comparison), the present cumulative pulse number may be stored with a value of 3, and corresponding binary data value of 011, as shown at 206. Pulse signal PS1 corresponding to this (high level) cumulative pulse number may be provided to PWM signal generator 103. The frequency and/or phase of pulse signal PS1 may be consistent with that of clock signal CLK2. Also, frequency information of clock signal CLK2 and/or the pulse count can be determined from pulse signal PS1.

The number of pulses of clock signal CLK2 may be counted from zero again by pulse count control circuit 102 until the current cumulative pulse number reaches the low level sampling pulse amount. Pulse signal PS2 corresponding to this cumulative pulse number may be provided to PWM signal generator 103. For example, if the low level sampling pulse amount is 4, when a pulse count of pulses of clock signal CLK2 by pulse count control signal 102 reaches 4 (e.g., as determined by a binary bit-by-bit comparison), that may be stored as a low level cumulative pulse number, and also represented in binary as 100, as shown at 207. Pulse signal PS2 corresponding to this (low level) cumulative pulse number may be provided to PWM signal generator 103. Also, the frequency and/or phase of pulse signal PS2 may be consistent with that of clock signal CLK2.

PWM signal generator 103 may generate signal PWM2 based on clock signal CLK2, and pulse signals PS1 and PS2. In this example, the period of signal PWM2 may be a sum of both pulse signal PS1 and pulse signal PS2. Also, the period of signal PWM2 may be less than that of signal PWM1, thus the frequency of signal PWM2 may be higher than that of signal PWM1. Also, the duty cycle of signal PWM2 can be represented as N1/(N1+N2), where N1 indicates the first cumulative pulse number (e.g., 3), and N2 indicates the second cumulative pulse number (e.g., 4).

An example waveform of the signal PWM2 generated by PWM signal generator 103 based on pulse signals PS1 and PS2 is shown as waveform 208 in FIG. 2. Period $T_{PWM\_H}$ of signal PWM2 can be indicated as $T_{PWM\_H}=(3T_2+4T_2)$, which may be much less than $T_{PWM\_L}$, and thus the frequency of which may be much higher than that of signal PWM1. Also, the duty cycle D of signal PWM2 can be indicated as:

$$D = \frac{3T_2}{3T_2 + 4T_2} = \frac{3}{7}$$

This may be consistent with or the same as the duty cycle of signal PWM1 (201). That is, the duty cycle of generated signal PWM2 may be the same as the duty cycle off received signal PWM1. In particular embodiments, signal PWM1 may be sampled based on clock signal CLK1, and the high level sampling pulse amount and low level sampling pulse amount in a given period of signal PWM1 can be determined. Similarly, the number of pulses of clock signal CLK2 may be counted to generate pulse signals PS1 and PS2. The high level sampling pulse amount and low level sampling pulse amount can be utilized for counting the number of pulses of CLK2. Signal PWM2 can then be generated with a higher frequency than that of signal PWM1, but with a same duty cycle. PWM signal generator 103 can generate signal PWM2 based on clock signal CLK2, high and low level sampling pulse amounts, and pulse signals PS1 and PS2. In this way, a relatively high frequency signal PWM2 can be generated from a relatively low frequency signal PWM1.

In various applications, a PWM signal (e.g., PWM2) generated by signal processing may be employed to achieve dimming control of a light-emitting diode (LED). Because the frequency of signal PWM2 may be relatively high, there may be a reduced (e.g., smaller sized resistors and/or capacitors) or no need for an RC filter, thus improving miniaturization and/or integration. In addition, because the duty cycle of signal PWM2 with a relatively high frequency can be the same as the duty cycle of signal PWM1 with a relatively low frequency, the same LED dimming performance as signal PWM1 can be achieved to meet the dimming requirements of an LED. Further, the signal processing of particular embodiments may also be utilized in other circuits and/or applications, other than LED dimming control.

Referring now to FIG. 3, shown is a schematic block diagram of an example signal processing circuit, in accordance with embodiments of the present invention. Sampling circuit 301 can include counters 3011, 3012, and 3013. For example, an input of counter 3011 can receive signal PWM1 and clock signal CLK1, and an output may be coupled to an input of counters 3012 and 3013. The clock input terminal (CLK) of counter 3011 can receive clock signal CLK1, and the reset control terminal (CLR) may receive signal PWM1 by way of an inverter.

Signal PWM1 may be sampled by counter 3011 based on the frequency of clock signal CLK1 through the period of signal PWM1, and then counter 3011 may be cleared to zero by reset terminal CLR. A sampling pulse (e.g., signal SP) can include a high level sampling pulse portion (e.g., including multiple pulses) and a low level sampling pulse portion (e.g., including multiple pulses) in one period of signal PWM1. Sampling pulse SP can be based on clock signal CLK1, and a high level sampling pulse amount (e.g., number of CLK1 cycles during a high portion of PWM1) and a low level sampling pulse amount (e.g., number of CLK1 cycles during a low portion of PWM1) can be determined. As shown, sampling pulse SP can be input to counters 3012 and 3013 by counter 3011.

Counter 3012 can use sampling pulse SP to determine and store the high level sampling pulse amount. Counter 2012 may also generate a count pulse (e.g., CP1) corresponding to the high level sampling pulse amount. Counter 3013 can receive sampling pulse SP to obtain and store the low level sampling pulse amount. Also, counter 3013 can generate a count pulse (e.g., CP2) corresponding to the low level sampling pulse amount. Further, an active low enable of counter 3012 and an active high enable of counter 3013 can connect to signal PWM1. In this particular implementation, the high and low level sampling pulse portions of sampling pulse SP can be separated through enable control of counters 3012 and 3013, to generate count pulse signals CP1 and CP2.

Pulse counter control circuit 302 may include pulse counter circuit 3021 and counter match circuit 3022. The reset control of pulse match circuit 3021 can connect to an output of counter match circuit 3022. The feedback (e.g., OR-gate output) of counter match circuit 3022 may be employed as a counter reset control signal for counter control (e.g., to start counting from zero for a given high or low signal portion or phase) by pulse counter circuit 3021. An input of counter match circuit 3022 can connect to outputs of sampling circuit 301 and pulse counter circuit 3021. In this way, a number of pulses output by pulse counter circuit 3021 can be considered with high and low level sampling pulse amounts output by sampling circuit 301. When the cumulative pulse number at pulse counter circuit 3021 matches the high level sampling pulse amount output from sampling circuit 301, pulse signal PS1 may be activated. Also, pulse signal PS1 may be provided to pulse counter circuit 3021 to reset the pulse number of pulse counter circuit 3021 for the next pulse counting operation to begin again from zero.

When the cumulative pulse number input to pulse counter circuit 3021 matches (e.g., by a binary data comparison) the low level sampling pulse amount input to sampling circuit 301, pulse signal PS2 may be activated. Also, the set control signal may be provided to pulse counter circuit 3021 by counter match circuit 3022 to reset the pulse number count of pulse counter circuit 3021, and next pulse counting can again begin from zero. The reset control and the counter match circuit control can be as shown above in the example of FIG. 2.

Counter match circuit 3022 can include counter match circuit 30221 and counter match circuit 30222. A first input terminal of counter match circuit 30221 can connect to an output terminal of counter 3012 to receive count pulse CP1 corresponding to the high level sampling pulse amount, and a second input terminal can connect to pulse counter circuit 3021 to receive a pulse number output signal. When the cumulative pulse number input to pulse counter circuit 3021 matches the high level sampling pulse amount, the current cumulative pulse number may be stored by counter match circuit 30221, and pulse signal PS1 may be activated. A reset control signal may be provided to pulse counter circuit 3021 to clear the counter pulse, and the next pulse count can begin again from zero.

A first input terminal of counter match circuit 30222 can connect to an output terminal of counter 3013 to receive count pulse CP2 corresponding to the low level sampling pulse amount, and a second input terminal can connect to pulse counter circuit 3021 to receive the pulse number output signal. When the cumulative pulse number input to pulse counter circuit 3021 matches the low level sampling pulse amount, the current cumulative pulse number may be stored by counter match circuit 30222, and pulse signal PS2 may be activated. A reset control signal may be provided to pulse counter circuit 3021 to clear the counter pulse, and the next pulse count can begin again from zero.

In this particular example, the enable terminal of counter match circuit 30221 can connect to the inverting output terminal of PWM signal generator 303, and the enable terminal of counter match circuit 30222 can connect to the true output terminal of PWM signal generator 303. Because output feedback of PWM signal generator 303 may be employed as enable control for counter match circuits 30221 and 30222, timing consistency can occur as to the high and low level sampling pulse amounts and/or signaling.

For example, counter 30211 can be employed as pulse counter circuit 3021. Clock input terminal CLK of counter 30211 can connect to clock signal CLK2, and its output terminal can connect to a second input terminal of counter match circuits 30221 and 30222. Also, reset terminal CLR of counter 30211 can connect to a logical-OR of outputs of counter match circuits 30221 and 30222, as shown. Set terminal S of flip-flop 3031 may be coupled to an output of counter match circuit 30221, and reset terminal R can connect to an output of counter match circuit 30222, and signal PWM2 may be generated at an output of flip-flop 3031.

This example signal processing circuit can also include linear level signal generator 304. An input of linear level signal generator 304 can connect to an output of PWM signal generator 303 (e.g., flip-flop 3031), and may amplify signal PWM2 to generate linear amplifying level signal and/or a reference signal $V_{ref}$. For example, various circuit structures of example signal processing circuits as described herein can be applied in LED dimming circuits that utilize PWM signals.

In one embodiment, a method of signal processing can include: (i) determining a high level sampling pulse amount by counting a number of pulses of a first clock signal during a high level portion of a period of a first PWM; (ii) generating a first pulse signal based on a second clock signal and the high level sampling pulse amount, where a frequency of the second clock signal is higher than a frequency of the first clock signal; (iii) determining a low level sampling pulse amount by counting a number of pulses of the first clock signal during a low level portion of the period of the first PWM signal; (iv) generating a second pulse signal based on the second clock signal and the low level sampling pulse amount; and (v) generating a second PWM signal based on the first and second pulse signals, where a period of the second PWM signal is less than a period of the first PWM signal, and where a duty cycle of the first PWM signal matches a duty cycle of the second PWM signal.

Figure 4:
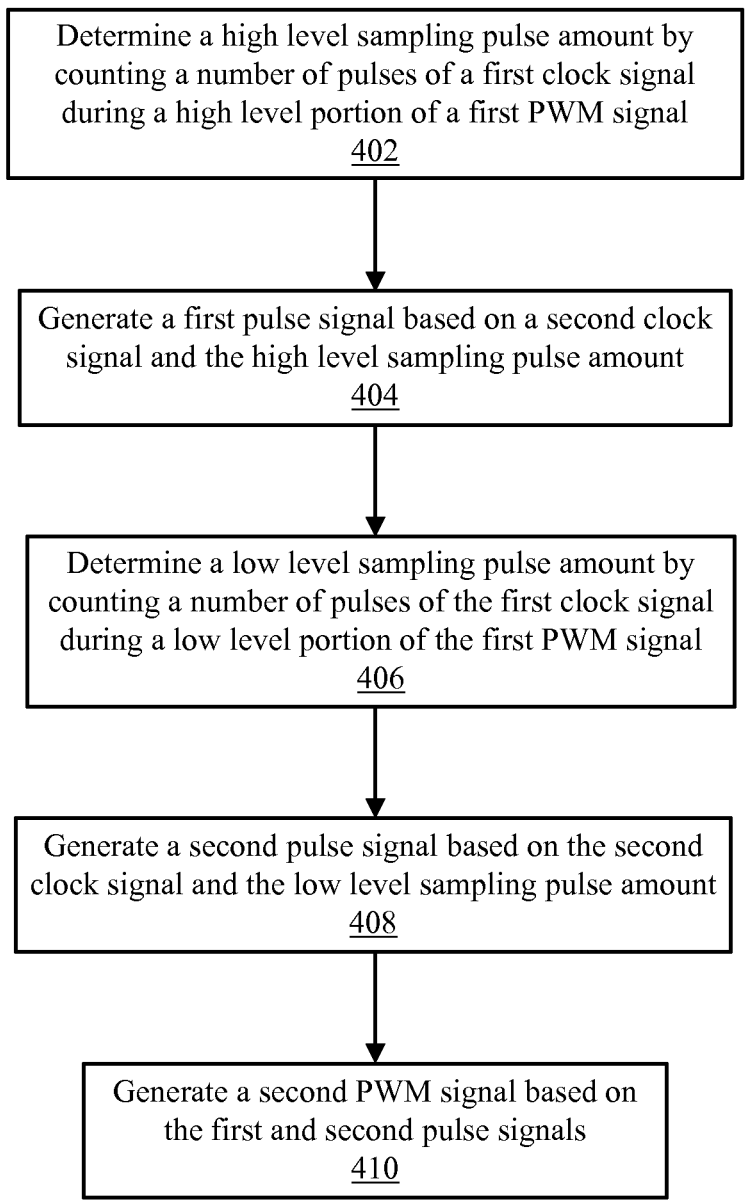
FIG. 4 is a flow diagram of an example method of processing a signal, in accordance with embodiments of the present invention.

Referring now to FIG. 4, shown is a flow diagram of an example method of processing a signal, in accordance with embodiments of the present invention. At 402, a high level sampling pulse amount can be determined by counting a number of pulses of a first clock signal (e.g., CLK1) during a high level portion of a period of a first PWM (e.g., PWM1). For example, sampling pulse SP can be generated by counter 3011, and may be used to determine count pulse CP1 via counter 3012. At 404, a first pulse signal (e.g., PS1) can be generated based on a second clock signal (e.g., CLK2) and the high level sampling pulse amount. For example, counter match circuit 30221 can receive count pulse CP1 and an output from counter 30211, which also receives CLK2.

In addition, a frequency of CLK2 may be higher than a frequency of CLK1. For example, the frequency of CLK2 may be from about 1.5 times to about 10 times, such as about 3 times, as high as the frequency of CLK1. At 406, a low level sampling pulse amount by counting a number of pulses of the first clock signal (e.g., CLK1) during a low level portion of the period of the first PWM signal (e.g., PWM1). For example, sampling pulse SP can be generated by counter 3011, and may be used to determine count pulse CP2 via counter 3013. At 408, a second pulse signal (e.g., PS2) can be generated based on the second clock signal (e.g., CLK2) and the low level sampling pulse amount. For example, counter match circuit 30222 can receive count pulse CP2 and an output from counter 30211, which also receives CLK2.

At 410, a second PWM signal (e.g., PWM2) can be generated based on the first and second pulse signals. For example, flip-flop 3031 can receive pulse signal PS1 at its set terminal, and pulse signal PS2 at its reset terminal. Also, a period of signal PWM2 may be less than a period of signal PWM1. In one example, the period of signal PWM2 can be a sum of pulse signal PS1 and pulse signal PS2. In addition, a duty cycle of signal PWM1 may substantially match a duty cycle of signal PWM2. The duty cycle of signal PWM2 can be represented as N1/(N1+N2), where N1 indicates a high level sampling pulse amount and N2 indicates a low level sampling pulse amount. In addition, signal PWM2 can be linearly amplified (e.g., via linear level signal generator 304) to generate a linear amplifying level signal (e.g., $V_{ref}$).

The embodiments were chosen and described in order to best explain the principles of the invention and its practical applications, to thereby enable others skilled in the art to best utilise the invention and various embodiments with modifications as are suited to the particular use contemplated. It is intended that the scope of the invention be defined by the claims appended hereto and their equivalents.

What is claimed is:

1. A method of signal processing, the method comprising:
   a) determining a high level sampling pulse amount by counting a number of pulses of a first clock signal during a high level portion of a period of a first pulse-width modulation (PWM) signal;
   b) generating a first pulse signal based on a second clock signal and said high level sampling pulse amount, wherein a frequency of said second clock signal is higher than a frequency of said first clock signal;
   c) determining a low level sampling pulse amount by counting a number of pulses of said first clock signal during a low level portion of said period of said first PWM signal;
   d) generating a second pulse signal based on said second clock signal and said low level sampling pulse amount; and
   e) generating a second PWM signal based on said first and second pulse signals, wherein a period of said second PWM signal is less than a period of said first PWM signal, and wherein a duty cycle of said first PWM signal matches a duty cycle of said second PWM signal.

2. The method of claim 1, wherein frequencies of said first and second pulse signals substantially match a frequency of said second clock signal.

3. The method of claim 1, wherein a phase of said first and second pulse signals substantially match a phase of said second clock signal.

4. The method of claim 1, wherein said period of said second PWM signal comprises a sum of pulse durations of said first and second pulse signals.

5. The method of claim 1, wherein said counting said number of pulses of said first clock comprises:
   a) generating a sampling clock by sampling said first PWM signal in accordance with a frequency of said first clock signal;
   b) generating a first count pulse using said sampling clock and corresponding to said high level sampling pulse amount; and
   c) generating a second count pulse using said sampling clock corresponding to said low level sampling pulse amount.

6. The method of claim 1, wherein said generating said second PWM signal comprises:
   a) receiving said first pulse signal at a set terminal of a flip-flop;
   b) receiving said second pulse signal at a reset terminal of said flip-flop; and
   c) generating said second PWM signal at an output of said flip-flop.

7. The method of claim 1, further comprising linearly amplifying said second PWM signal to generate a linear amplifying level signal.

8. The method of claim 1, further comprising controlling dimming of a light-emitting diode (LED) using said second PWM signal.

9. A signal processing circuit, comprising:
   a) a sampling circuit configured to determine a high level sampling pulse amount by counting a number of pulses of a first clock signal during a high level portion of a period of a first pulse-width modulation (PWM) signal, and to determine a low level sampling pulse amount by counting a number of pulses of said first clock signal during a low level portion of said period of said first PWM signal;
   b) a pulse counter control circuit configured to generate a first pulse signal based on a second clock signal and said high level sampling pulse amount, and to generate a second pulse signal based on said second clock signal and said low level sampling pulse amount, wherein a frequency of said second clock signal is higher than a frequency of said first clock signal; and
   c) a PWM signal generator configured to generate a second PWM signal based on said first and second pulse signals, wherein a period of said second PWM signal is less than a period of said first PWM signal, and wherein a duty cycle of said first PWM signal matches a duty cycle of said second PWM signal.

10. The signal processing circuit of claim 9, wherein frequencies of said first and second pulse signals substantially match a frequency of said second clock signal.

11. The signal processing circuit of claim 9, wherein a phase of said first and second pulse signals substantially match a phase of said second clock signal.

12. The signal processing circuit of claim 9, wherein said period of said second PWM signal comprises a sum of pulse durations of said first and second pulse signals.

13. The signal processing circuit of claim 9, wherein said sampling circuit comprises:
   a) a first counter configured to receive said first PWM signal and said first clock signal, and to sample said first PWM signal in accordance with a frequency of said first clock signal to generate a sampling pulse;
   b) a second counter coupled to an output of said first counter, wherein said second counter is configured to generate a first count pulse corresponding to said high level sampling pulse amount; and
   c) a third counter coupled to said output of said first counter, wherein said third counter is configured to generate a second count pulse corresponding to said low level sampling pulse amount.

14. The signal processing circuit of claim 9, wherein said PWM signal generator comprises a flip-flop configured to generate said second PWM signal based on said first and second count pulses and an output from said pulse counter control circuit.

15. The signal processing circuit of claim 9, further comprising a linear level signal generator configured to linearly amplify said second PWM signal to generate a linear amplifying level signal.

16. The signal processing circuit of claim 9, further comprising a light-emitting diode (LED) having dimming control using said second PWM signal.

* * * * *